(12) United States Patent
Lamm

(10) Patent No.: US 12,548,422 B2
(45) Date of Patent: Feb. 10, 2026

(54) CHILD COMPANION DEVICE AND A SYSTEM THEREOF

(71) Applicant: CudlClock IP LLC, Brooklyn, NY (US)

(72) Inventor: Daniel Lamm, Brooklyn, NY (US)

( * ) Notice: Subject to any disclaimer, the term of this patent is extended or adjusted under 35 U.S.C. 154(b) by 83 days.

(21) Appl. No.: 18/424,947

(22) Filed: Jan. 29, 2024

(65) Prior Publication Data
US 2025/0246059 A1    Jul. 31, 2025

(51) Int. Cl.
*G08B 21/02*    (2006.01)

(52) U.S. Cl.
CPC ..... *G08B 21/0208* (2013.01); *G08B 21/0277* (2013.01)

(58) Field of Classification Search
None
See application file for complete search history.

(56) References Cited

U.S. PATENT DOCUMENTS

| | | | |
|---|---|---|---|
| 6,678,215 B1 | 1/2004 | Treyz | |
| 7,522,477 B1 | 4/2009 | Sheldon | |
| 7,683,763 B2 | 3/2010 | Nelson | |
| 9,527,001 B2 * | 12/2016 | Richardson | A63H 3/006 |
| 10,165,230 B2 * | 12/2018 | Glazer | H04N 23/20 |
| 11,179,540 B2 * | 11/2021 | Vukovic | G04G 21/06 |
| 2009/0016168 A1 | 1/2009 | Smith | |
| 2009/0105524 A1 | 4/2009 | Bressler | |
| 2010/0203490 A1 | 8/2010 | Hocherman | |
| 2010/0296370 A1 * | 11/2010 | Holmes | G04F 1/005 368/73 |
| 2013/0280985 A1 * | 10/2013 | Klein | A63H 3/003 446/297 |
| 2014/0198623 A1 * | 7/2014 | Hill | G04B 47/00 368/10 |
| 2018/0182491 A1 * | 6/2018 | Belliveau | G16H 20/17 |
| 2022/0084386 A1 * | 3/2022 | Lopez | H04W 4/029 |
| 2024/0161214 A1 * | 5/2024 | Yonkov | G06Q 50/165 |

FOREIGN PATENT DOCUMENTS

| | | | | |
|---|---|---|---|---|
| CA | 3236086 A1 * | 7/2016 | ......... | A61B 5/14546 |
| CA | 3200971 A1 * | 6/2022 | ............. | A47D 13/06 |
| WO | WO-2016079888 A1 * | 5/2016 | ....... | G08B 13/19684 |

* cited by examiner

*Primary Examiner* — Fekadeselassie Girma

(57) ABSTRACT

A child companion device, a computer program product, and a system are disclosed. The child companion device includes a housing having a child friendly structure to house sensors to sense ambient parameters associated with a place of installation and light sources to provide lighting-based outputs. Further, the child companion device includes audio-video devices for providing sound-based outputs, capturing images and videos, and capturing audio associated with the place of installation. The child companion device also includes network connection modules to communicatively couple with a user device for data exchange pertaining to the sensors, the light sources, and the audio-video devices. Additionally, an application installed on the user device facilitates a user with receiving data from the child companion device, analyzing the received data, sending data to the child companion device, and controlling the child companion device.

20 Claims, 11 Drawing Sheets

CHILD COMPANION DEVICE AND A SYSTEM THEREOF

FIELD OF THE PRESENT DISCLOSURE

Embodiments of the present disclosure generally relate to the field of child care. Embodiments of the present disclosure relate to a child companion device and a system thereof.

BACKGROUND OF THE DISCLOSURE

Establishing healthy routines in early childhood is important for several reasons, as this period of life lays the foundation for future physical, emotional, and cognitive development. Further, the healthy routines also help a caregiver (such as a parent) in developing predictability and stability for the child (such as what to expect and/or when to expect), improving physical health of the child (such as by providing regular sleep/nutrition/physical activity), improving cognitive development of the child (such as by time management, organization, and self-control), improving emotional regulation, developing social skills, and/or developing long-term habits. There are several technologies used for monitoring the child for establishing healthy routines, such as interactive learning applications, routine management applications, sleep relaxation tools, parent-child interaction platforms, language development tools, physical activity monitoring, health monitoring, emotional regulation applications, mindfulness applications, and creative expression tools.

Further, there are several automated monitoring devices for children that employ such technologies to take care of the children and/or establish health routines. Some of the automated monitoring devices are associated with baby monitors, health and vital sign monitors, sleep trackers, Global Positioning System (GPS) and location devices, wearable health trackers, allergen and environmental monitors, and remote viewings and alert devices. Such devices have one or more limitations such as, accuracy of measurements, false alarms, limited range, interference, dependence on internet and power, privacy and security concerns, calibrations and maintenance, child comfort and compliance, lack of age and developmental considerations, and no automatic data interpretation. In addition to such limitations, the caregivers must utilize multiple of such automated monitoring devices that are not integrated, have limited capability, and have minimal flexibility in terms of creating and implementing healthy routines for the children. Accordingly, there is a lot of scope for improvement in the existing devices for monitoring children and providing valuable insights/suggestions to establish healthy routines for the children. Some of these existing devices are described below with exemplary limitations:

A rest device with baby sound machine, night light, time-to-rise plus audio monitor, white noise soother, toddler sleep trainer, and kids alarm clock. However, such a device has a large light with a 360-degree visibility but it is not an interactive type and does not talk back to the child to either give instructions or to keep the child busy. Further, such rest device does not have a child friendly structure and is incapable of monitoring activities associated with the child or the place of installation, does not sense basic parameters (such as temperature) of the place of installation, and is incapable of providing any suggestions related to routine (for example, sleep routine).

Another device is a stoplight sleep enhancing alarm clock for kids that can have various figures to attract a child. However, such device is not a child monitoring device but just an alarm clock with child-friendly figures. Specifically, some of the limitations are Wi-Fi incompatibility, difficulty in setting time, not kid-friendly, no control applications, incapability to give instructions to the child, and/or to sense parameters associated with the child.

Yet another device is a child trainer device with alarm clock, night sleep sound and a screen to display facial expressions. However, such a device also has several limitations, such as Wi-Fi incompatibility, difficulty in setting time, not kid-friendly, no control applications, in capability to give instructions to the child, and incapability to sense parameters associated with the child.

Therefore, there is a need for a child companion device that monitors the child to take smart decisions and helps the caregivers to establish healthy routines for the child and overcome the drawbacks of the prior arts.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

The disclosed subject matter provides a child companion device. The child companion device eliminates the need for multiple devices and allows parents to easily select and customize routines for bedtime, wake-up, and many other activities to promote a healthy and fun structure for children. Further, the disclosed child companion device provides the caregiver with multiple out-of-the-box routines, and can easily be customized for varying situations. Furthermore, the child companion device has a marketplace that allows third parties to create unique content, stories and routines that support various activities required for religious, cultural, or special need development and education. Additionally, the child companion device is easy to set up, monitor and control via the application that supports multiple child companion devices to take care of multiple children while providing a secure controlled access for various caretakers.

In some embodiments, the child companion device is a fully integrated all-in-one device that allows the features to work together and allows users to create routines that interact with all the features. For example, the child companion device may listen and watch for when a child wakes up in the middle of the night and automatically start playing soothing sounds or a story. Or if the light sensor detects light in the middle of the night, it may notify the parents that the child has turned on the lights in the room. Further, the child companion device facilitates the user to interact with all the sensors and features to make a truly customizable routines, such that the routines are both event-driven and time-driven and may be triggered by a set time or by something happening like the child starting to cry in the middle of the night or the child is making a lot of movements in the middle of the night. The child companion device further can use Artificial Intelligence (AI) or another mechanism to monitor the child's sleep and automatically trigger the routine that will give the child the best night's sleep. Accordingly, the child companion device integrates multiple features in a smart way that allows them to be monitored and controlled remotely by the user. Additionally, the child companion device has a self-learning child development feature to learn how to give a child the best night's sleep, learn what sounds help the child sleep better by watching and listening to the child and automatically adjusting the white noise to improve the child's sleep. Accordingly, the child companion device builds a whole ecosystem of smart kid's devices that all talk to each other and aid in the child's development.

In some embodiments, the child companion device includes a housing having a child friendly structure. The housing houses one or more sensors to sense one or more ambient parameters associated with a place of installation. The one or more sensors include a temperature sensor, an air quality sensor, and/or a light sensor to sense data associated with temperature, air quality, and/or luminance in the place of installation, respectively. Further, the housing houses one or more light sources to provide one or more lighting based outputs. The one or more light sources associated with a countdown timer, a clock, and/or a night light to provide outputs pertaining to lighting requirements, countdown, time, alarm, time left to sleep, and/or time left to wake-up. In an embodiment, intensity of the one or more light sources gradually decreases with the time left to sleep and gradually increases with the time left to wake-up. Further, the child companion devices include a customizable snooze button associated with the operation of the alarm.

The housing further houses one or more audio-video devices for providing sound-based outputs, capturing images and videos associated with the place of installation, and/or capturing audio associated with the place of installation. Further, the one or more audio-video devices include a speaker, a camera, and/or a microphone to provide audio instruction to a child, generate white noise, to capture audio, images, and videos of the child and the place of installation. In an embodiment, the camera is a night vision camera with a wide-angle lens to clearly capture wide area images and videos even in darkness. Further, the housing houses one or more network connection modules to communicatively couple the child companion device with a user device for data exchange pertaining to the one or more sensors, the one or more light sources, and/or the one or more audio-video devices. In an embodiment, the one or more network connection modules include a Bluetooth module and/or a Wireless Fidelity (Wi-Fi) module. In an embodiment, the user device has an application installed on it that facilitates a user with receiving data from the child companion device, analyzing the received data, sending data to the child companion device, and/or controlling the child companion device.

In some embodiments, the child companion device further includes an analyser module to analyze the one or more ambient parameters, the captured images, the captured videos, and/or the captured audio the data to determine an ideal sleep routine for the child by employing one or more Artificial Intelligence (AI) models to control the child companion device.

In some embodiments, a computer program product associated with an application installed on a user device is disclosed. The application facilitates a user with monitoring and controlling a child companion device. The computer program product includes the steps of receiving data from the child companion device associated with a place of installation and corresponding to one or more ambient parameters, captured images, captured videos, and/or captured audio. In an embodiment, the one or more ambient parameters include temperature, air quality, and/or luminance in the place of installation. Further, the computer program product includes the steps of analyzing the received data to determine an ideal sleep routine by employing one or more Artificial Intelligence (AI) models. The computer program product also includes the steps of rendering the received data from the child companion device and/or the determined ideal sleep routine to a user. Next, the computer program product includes the steps of receiving one or more inputs from the user associated with one or more instructions, a custom sleep routine, an approval for the determined ideal sleep routine, and/or a selection of a sleep routine from one or more sleep routine in a marketplace. Next, the computer program product includes the steps of sending the received one or more inputs to the child companion device for rendering the one or more inputs, and/or controlling one or more components of the child companion device to implement the one or more inputs. In an embodiment, implementing the one or more inputs on the child companion device corresponds to providing one or more lighting based outputs, providing sound-based outputs, and/or controlling the intensity of one or more light sources. Further, controlling the intensity of the one or more light sources to gradually decreasing the intensity with the time left to sleep and gradually increasing the intensity with the time left to wake-up.

In some embodiments, a system having a child companion device and a user device is disclosed. In an embodiment, the child companion device includes one or more sensors to sense one or more ambient parameters associated with a place of installation. Further, the child companion device includes one or more light sources to provide one or more lighting based outputs. The child companion device also includes one or more audio-video devices for providing sound-based outputs, capturing images and videos associated with the place of installation, and/or capturing audio associated with the place of installation. Further, the child companion device includes one or more network connection modules to communicatively couple the child companion device with a user device for data exchange pertaining to the one or more sensors, the one or more light sources, and/or the one or more audio-video devices.

In an embodiment, the user device has an application that receives data from a child companion device associated with a place of installation and corresponding to one or more ambient parameters, captured images, captured videos, and/or captured audio. The application performs the steps of analyzing the received data to determine an ideal sleep routine by employing one or more Artificial Intelligence (AI) models. Further, the application performs the steps of rendering the received data from the child companion device and/or the determined ideal sleep routine to a user. The application also performs the steps of receiving one or more inputs from the user associated with one or more instructions, a custom sleep routine, an approval for the determined ideal sleep routine, and/or a selection of a sleep routine from one or more sleep routines in a marketplace. Furthermore, the application performs the steps of sending the received one or more inputs to the child companion device for rendering the one or more inputs, and/or controlling one or more components of the child companion device to implement the one or more inputs.

The features and advantages of the subject matter hereof will become more apparent in light of the following detailed description of selected embodiments, as illustrated in the accompanying FIGURES. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGURES and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
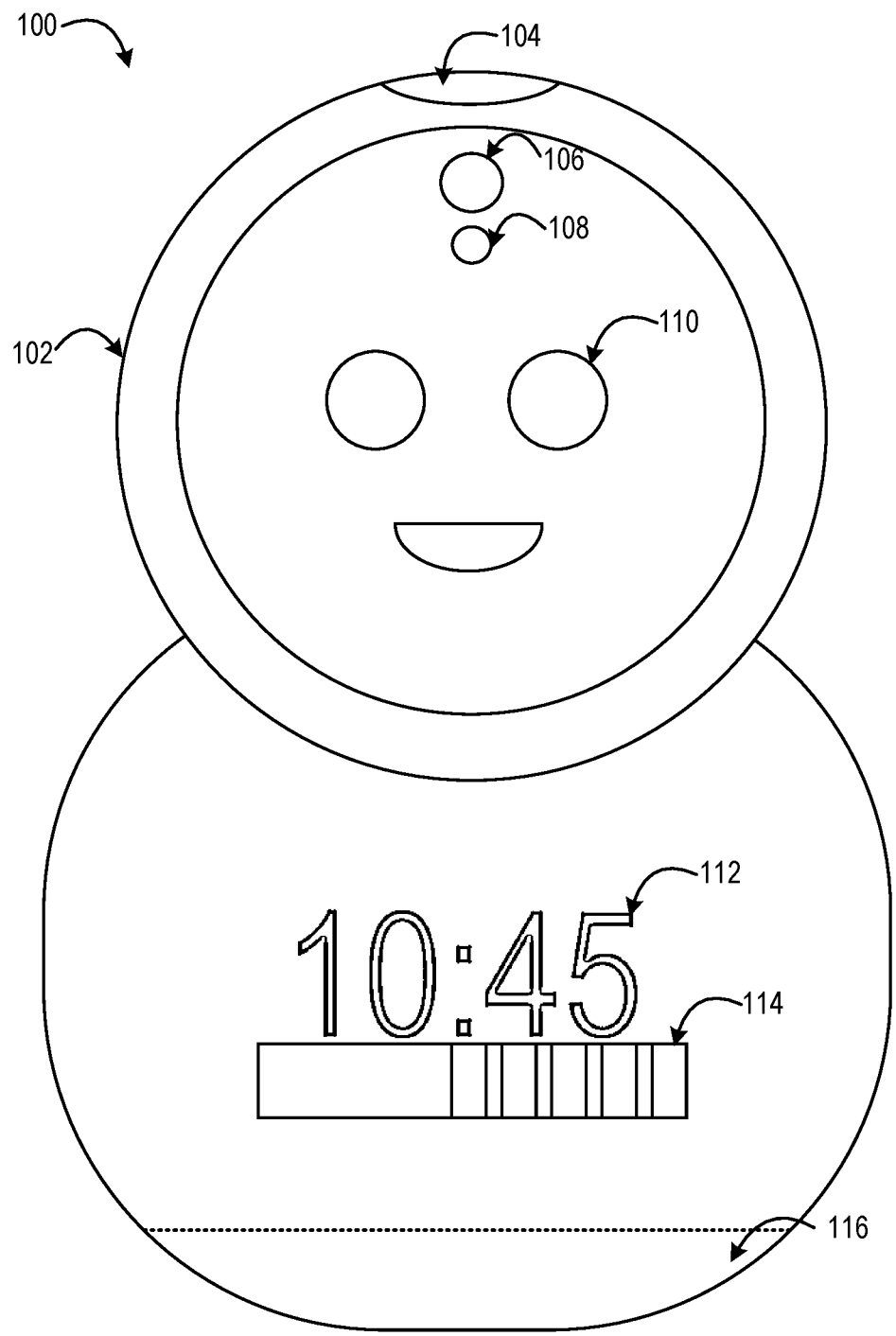
FIG. 1 illustrates a child companion device, in accordance with an embodiment of the present disclosure.

The detailed description set forth below in connection with the appended drawings is intended as a description of exemplary embodiments in which the presently disclosed disclosure can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed disclosure. However, it will be apparent to those skilled in the art that the presently disclosed disclosure may be practiced without these specific details. In some instances, well-known structures and devices are shown in block diagram form in order to avoid obscuring the concepts of the presently disclosed disclosure.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present disclosure may be provided as a computer program product, which may include a non-transitory, machine-readable storage medium tangibly embodying thereon instructions, which may be used to program the computer (or other electronic devices) to perform a process. The machine-readable medium may include, but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the definition.

Further, the term "module" may be software or hardware particularly programmed to receive an input, perform one or more processes using the input, and provide an output. The input, output, and processes performed by various modules will be apparent to one skilled in the art based on the present disclosure.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

In the present specification, an embodiment showing a singular component should not be considered limiting. Rather, the subject matter preferably encompasses other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present subject matter encompasses present and future known equivalents to the known components referred to herein by way of illustration.

It will be understood that in the event parts of different embodiments have similar functions or uses, they may have been given similar or identical reference numerals or descriptions. It will be understood that such duplication of reference numerals is intended solely for efficiency and ease of understanding the present disclosure and are not to be construed as limiting in any way, or as implying that the various embodiments themselves are identical.

Unless defined otherwise, all technical and scientific terms used herein have the same meaning as commonly understood by one of ordinary skills in the art to which the present disclosure belongs. However, some specific definitions are presented below.

In some embodiment, a child companion device is disclosed. The child companion device may include a housing having a child friendly structure. In one embodiment, the child friendly structure may correspond to a smooth design having no sharp edges or areas that can affect a child at least in terms of injury. In another embodiment, the child friendly structure may correspond to a design capable of attracting a child, such as representing a toy like a teddy bear. Further, the housing of the child companion device may house one or more sensors (such as, a temperature sensor, an air quality sensor, a light sensor, or the like) to sense one or more ambient parameters associated with a place of installation of the child companion device. The housing may further house one or more light sources (such as, a countdown timer, a clock, a night light, or the like) to provide one or more lighting based outputs. Further, the housing may also house one or more audio-video devices (such as, a speaker, a camera, a microphone, or the like) for providing sound-based outputs, capturing images and videos associated with the place of installation, and capturing audio associated with the place of installation. Additionally, the housing may also house one or more network connection modules (such as, Bluetooth, Wi-Fi, or the like) to communicatively couple the child companion device with a user device (such as, a mobile phone, a tablet, a laptop, a computer, or the like) for data exchange. The data exchanges may be associated with the one or more sensors, the one or more light sources, and the one or more audio-video devices. In an embodiment, an application may be installed on the user device to facilitate a user with receiving data from the child companion device, analyzing the received data, sending data to the child companion device, and/or controlling the child companion device.

In some embodiment, a computer program product associated with the application for monitoring and controlling the child companion device is disclosed. The application may be installed on the user device. The application may perform the steps of receiving data from the child companion device associated with a place of installation and corresponding to one or more ambient parameters, captured images, captured videos, and/or captured audio. Further, the application may perform the steps of analyzing the received data to determine an ideal sleep routine by employing one or more Artificial Intelligence (AI) models. The application may perform the steps of rendering the received data from the child companion device and/or the determined ideal sleep routine to a user. Furthermore, the application may perform the steps of receiving one or more inputs from the user associated with one or more instructions, a custom sleep routine, an approval for the determined ideal sleep routine, and/or a selection of a sleep routine from one or more sleep routine in a marketplace. The application may also perform the steps of sending the received one or more inputs to the child companion device for rendering the one or more inputs, and/or controlling one or more components of the child companion device to implement the one or more inputs.

In some embodiments, a system having the child companion device and the user device is disclosed. The child companion device may include the one or more sensors to sense one or more ambient parameters associated with a place of installation of the child companion device. The child companion device may further include one or more light sources to provide one or more lighting based outputs. Further, the child companion device may include one or more audio-video devices for providing sound-based outputs, capturing images and videos associated with the place of installation, and capturing audio associated with the place of installation. Additionally, the child companion device may include one or more network connection modules to communicatively couple the child companion device with the user device for data exchange pertaining to the one or more sensors, the one or more light sources, and the one or more audio-video devices. In an embodiment, the user device may have the application to perform the steps of receiving data from the child companion device associated with a place of installation and corresponding to one or more ambient parameters, captured images, captured videos, and/or captured audio. Further, the application may perform the steps of analyzing the received data to determine an ideal sleep routine by employing one or more Artificial Intelligence (AI) models. The application may perform the steps of rendering the received data from the child companion device and/or the determined ideal sleep routine to a user. Furthermore, the application may perform the steps of receiving one or more inputs from the user associated with one or more instructions, a custom sleep routine, an approval for the determined ideal sleep routine, and/or a selection of a sleep routine from one or more sleep routines in a marketplace. The application may also perform the steps of sending the received one or more inputs to the child companion device for rendering the one or more inputs, and/or controlling one or more components of the child companion device to implement the one or more inputs FIG. 1 illustrates a child companion device 100, in accordance with an embodiment of the present disclosure. In an embodiment, the child companion device 100 may include a housing 102 to house one or more sensors, one or more light sources, one or more audio-video devices, and one or more network connection modules. For the purpose of the disclosure, the child may correspond to a new born (aged 0-3 months), an infant (aged 3-12 months), a toddler (aged 1-3 years), a preschool child (aged 3-5 years), or a school age child (aged 5-17 years). The child companion device 100 may be installed in the child's room at any suitable place, such as a bedside table, a study table, mounted on a wall, or the like. In an embodiment, the housing 102 may have a child friendly structure for the safety of the child or to aesthetically please the child. In one embodiment, the child friendly structure may correspond to a smooth design having no sharp edges or areas that can injure the child. In another embodiment, the child friendly structure may correspond to a design capable of attracting the child, such as representing a toy like a teddy bear.

In some embodiments, the one or more sensors may sense one or more ambient parameters associated with the place of installation. The one or more sensors may, without any limitation, include a temperature sensor, an air quality sensor, and a light sensor. The temperature sensors may sense the temperature in the child's room, the air quality sensor may sense the air quality index in the child's room, and the light sensor may sense the luminance in the child's room. Another sensor that may be included in some embodiments are noise sensors to determine the amount of noise in a child's room while the child is asleep. In an embodiment, the data sensed by the one or more sensors may be provided to a caretaker (such as, a parent or a guardian) in real-time through one or more wireless technologies. In another embodiment, the data sensed by the one or more sensors may be provided to the caretaker after pre-processing, such that the data may be provided to the caretaker only after it exceeds a pre-defined threshold. In an additional embodiment, the data sensed by the one or more sensors may also be displayed on a screen (not shown) provided on the child companion device 100. The data displayed on the screen (not shown) may include reports about the air quality signaling to the user whether the child's diaper may need to be changed as well.

In some embodiments, the one or more light sources may provide one or more lighting based outputs. The one or more light sources may, without any limitation, correspond to a countdown timer 114, a clock 112, and a night light 110. The countdown timer 114 may represent time left for sleep time (i.e. a pre-defined time at which the child shall sleep), time left to wake-up (i.e. a pre-defined time at which the child shall wake-up), or time left for completion of any task (such as answering a question, cleaning the room, playing game, watching television, doing homework, or the like). The clock 112 may, without any limitation, correspond to a traditional clock to display the time, an alarm clock, or the like. For the function of the alarm clock, the child companion device 100 may also include a customizable snooze button 104. The night light 110 may, without any limitation, correspond to one or more Light Emitting Diodes (LED) light for controlling the luminance in the child's room such as by increasing brightness, decreasing brightness, increasing cool colors, increasing warm colors, or the like. In an embodiment, the countdown timer 114, the clock 112, and/or the night light 110 may gradually decrease the intensity with the time left to sleep and/or may gradually increase the intensity with the time left to wake-up.

In some embodiments, the one or more audio-video devices may, without any limitation, provide sound-based outputs, capture images and videos associated with the place of installation, and capture audio associated with the place of installation. The one or more audio-video devices may, without any limitation, include a speaker 116, a camera 106, and a microphone 108. The speaker 116 may provide one or more sound-based outputs corresponding to, without any limitation, caretaker's real-time instructions, one or more pre-recorded instructions, automatic instructions, interaction with the child, answers to the child's questions, or the like. In some embodiment, the speaker 116 may also generate white noise to minimize surrounding noises based on the sleep time of the child (such as when the sleep time is close or while sleeping), or as may be required to improve child's focus (such as while studying, meditating, or the like). The camera 106 may capture images and videos of the child as well as the place of installation to keep a record of activities in the child's room or to show the situation in the child's room to the caretaker either in real-time or at any point of time in the future. In an embodiment, the camera 106 may be a night vision camera to capture quality images and/or videos in darkness, a wide-angle lens camera to capture wire area images, or a combination thereof. Further, the microphone 108 may capture audio of the child as well as the place of installation to keep a record of activities in the child's room or to show the situation in the child's room to the caretaker either in real-time or any point of time in future. The captured images, videos, and audio of the child by the camera 106 and/or the microphone 108 may facilitate the caretaker to monitor the activities of the child associated with, without any limitation, sleeping, waking up, crying, feeding, being in trouble, happiness, or the like.

In some embodiments, the one or more network connection modules may, without any limitation, include Bluetooth and Wireless Fidelity (Wi-Fi). The one or more network connection modules may communicatively couple the child companion device 100 with a user device associated with a user for data exchange pertaining to the one or more sensors, the one or more light sources, and/or the one or more audio-video devices. In an embodiment, the user may correspond to the caretaker, a doctor, or the like. The user device may have an application installed on it that may facilitate the user to receive data from the child companion device 100, analyzing the received data, sending data to the child companion device 100, and controlling the child companion device 100. The operation of the application has been discussed in the following paragraphs.

In some embodiment, the child companion device 100 may include a voice recognition technology (not shown) for controlling the child companion device 100 and telling it to either set an alarm, play music, play a game, or any other technology that comes with or is connected to the child companion device 100.

In some embodiment, the child companion device 100 may include an analyzer module (not shown) that may analyze the one or more ambient parameters, the captured images, the captured videos, and/or the captured audio to determine an ideal sleep routine, or any other routine essential for the child by employing one or more Artificial Intelligence (AI) models. Such determined routes may either be displayed to the user for affirmation or may directly be implemented to control the child companion device 100. For example, if the child usually wakes up in the night, then the analyzer module may determine a sleep routine with a specific sleep time, sleep duration, and/or a white noise that needs to be played while the child sleeps.

FIGS. 2A-2J illustrate block diagrams of various configurations of the child companion device 100A-100J, in accordance with an embodiment of the present disclosure. As discussed in previous paragraphs, the child companion device 100 may include one or more sensors 202, one or more light sources (or LEDs) 204, one or more audio-video devices (or A/V) 206, and one or more network modules 208. However, the child companion device 100 may have various configurations based on various conditions, such as affordability, connectivity, suitability, usage, or the like.

Figure 2A:
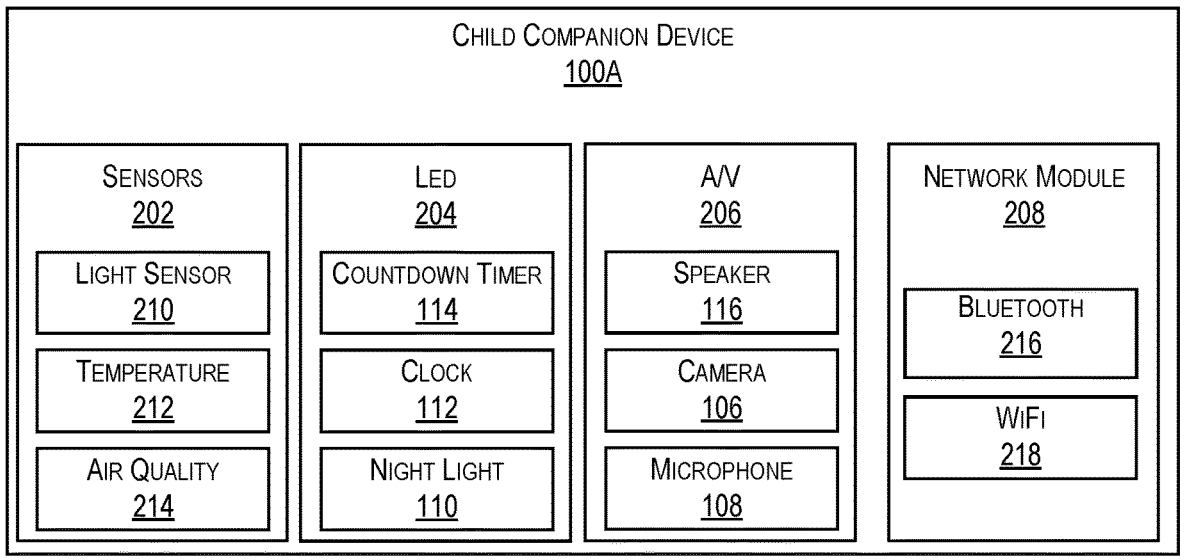
FIGS. 2A-2J illustrate block diagrams of various configurations of the child companion device, in accordance with an embodiment of the present disclosure.

In an embodiment, as shown in FIG. 2A, a first configuration of the child companion device 100A may include the one or more sensors 202 having the light sensor 210, the temperature sensor 212, and an air quality sensor 214. Further, the one or more LEDs 204 may include the countdown timer 114, the clock 112, and the night light 110. The one or more audio-video devices 206 may include the speaker 116, the camera 106, and the microphone 108. Further, the one or more network modules 208 may include the Bluetooth 216 and the Wi-Fi 218.

Figure 2B:
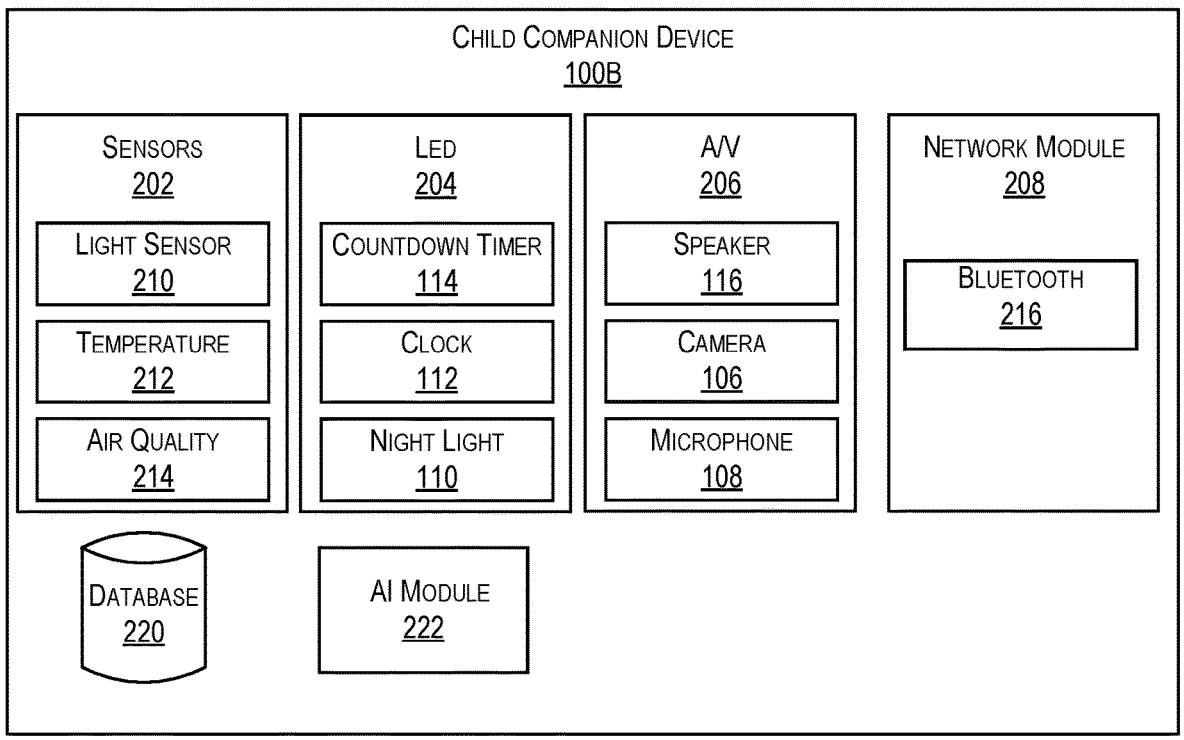

In an embodiment, as shown in FIG. 2B, a second configuration of the child companion device 100B may include the one or more sensors 202 having the light sensor 210, the temperature sensor 212, and an air quality sensor 214. Further, the one or more LEDs 204 may include the countdown timer 114, the clock 112, and the night light 110. The one or more audio-video devices 206 may include the speaker 116, the camera 106, and the microphone 108. Further, the one or more network modules 208 may include the Bluetooth 216. Further, the child companion device 100 B may also have a database 220 and an associated AI module 222. The child companion device 100 B may store the data received from one or more sensors and/or components in the database 220, such that the AI module 222 may analyze the data to determine one or more routines for the child.

Figure 2C:
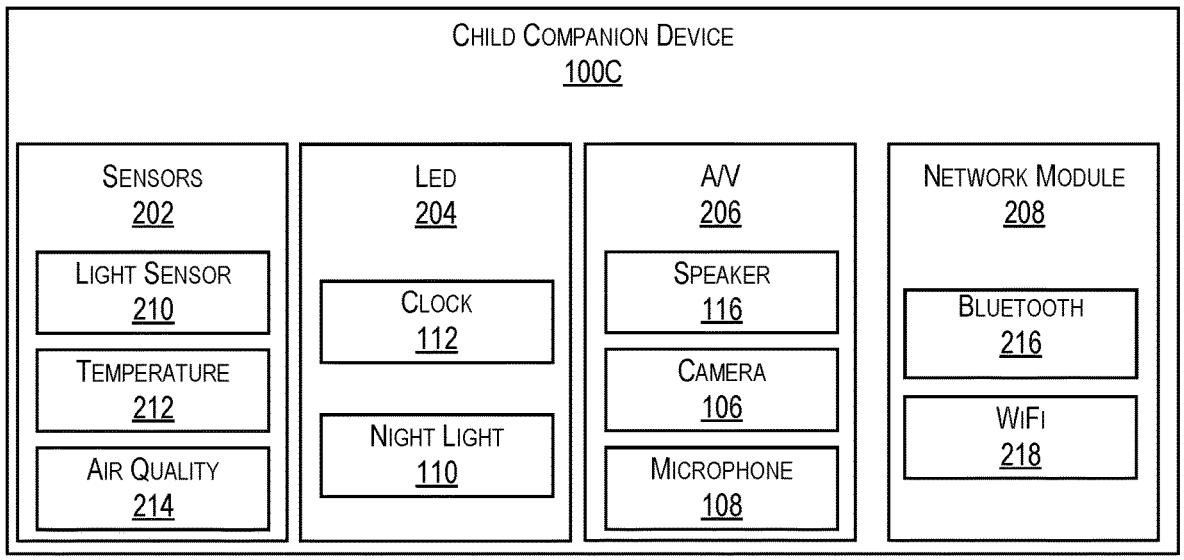

In an embodiment, as shown in FIG. 2C, a third configuration of the child companion device 100C may include the one or more sensors 202 having the light sensor 210, the temperature sensor 212, and an air quality sensor 214. Further, the one or more LEDs 204 may include the clock 112 and the night light 110. The one or more audio-video devices 206 may include the speaker 116, the camera 106, and the microphone 108. Further, the one or more network modules 208 may include the Bluetooth 216 and the Wi-Fi 218.

Figure 2D:
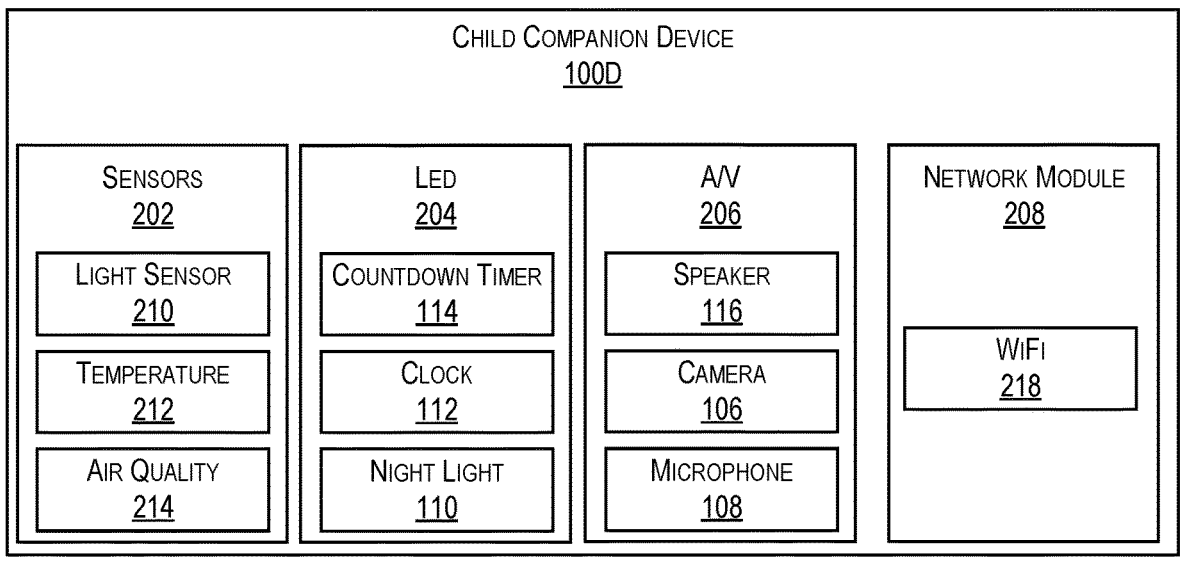

In an embodiment, as shown in FIG. 2D, a fourth configuration of the child companion device 100D may include the one or more sensors 202 having the light sensor 210, the temperature sensor 212, and an air quality sensor 214. Further, the one or more LEDs 204 may include the countdown timer 114, the clock 112, and the night light 110. The one or more audio-video devices 206 may include the speaker 116, the camera 106, and the microphone 108. Further, the one or more network modules 208 may include the Wi-Fi 218.

Figure 2E:
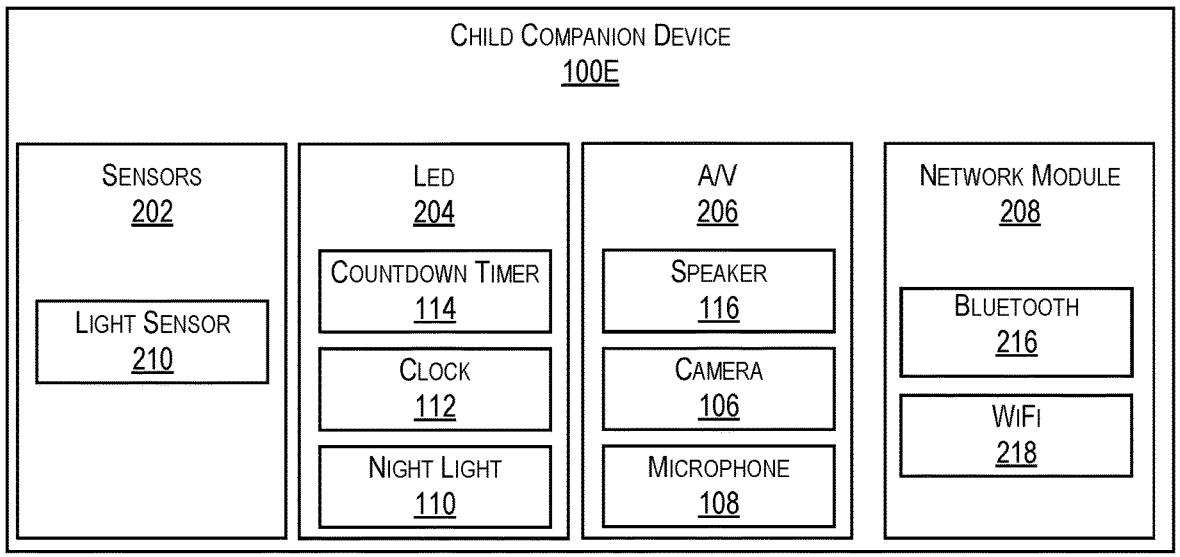

In an embodiment, as shown in FIG. 2E, a fifth configuration of the child companion device 100E may include the one or more sensors 202 having the light sensor 210. Further, the one or more LEDs 204 may include the countdown timer 114, the clock 112, and the night light 110. The one or more audio-video devices 206 may include the speaker 116, the camera 106, and the microphone 108. Further, the one or more network modules 208 may include the Bluetooth 216 and the Wi-Fi 218.

Figure 2F:
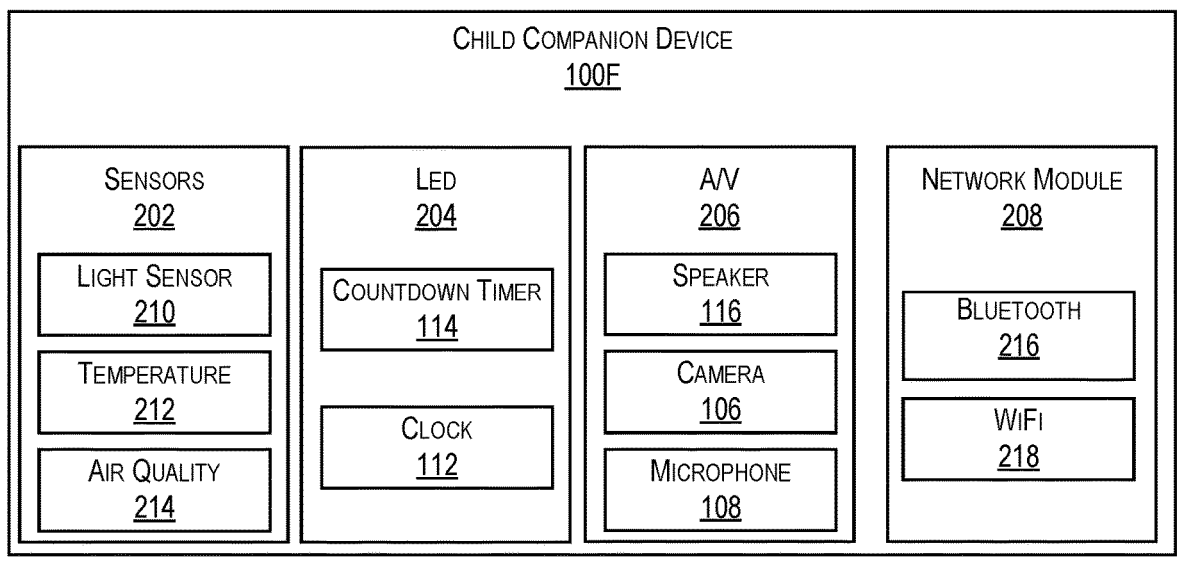

In an embodiment, as shown in FIG. 2F, a sixth configuration of the child companion device 100F may include the one or more sensors 202 having the light sensor 210, the temperature sensor 212, and an air quality sensor 214. Further, the one or more LEDs 204 may include the countdown timer 114 and the clock 112. The one or more audio-video devices 206 may include the speaker 116, the camera 106, and the microphone 108. Further, the one or more network modules 208 may include the Bluetooth 216 and the Wi-Fi 218.

Figure 2G:
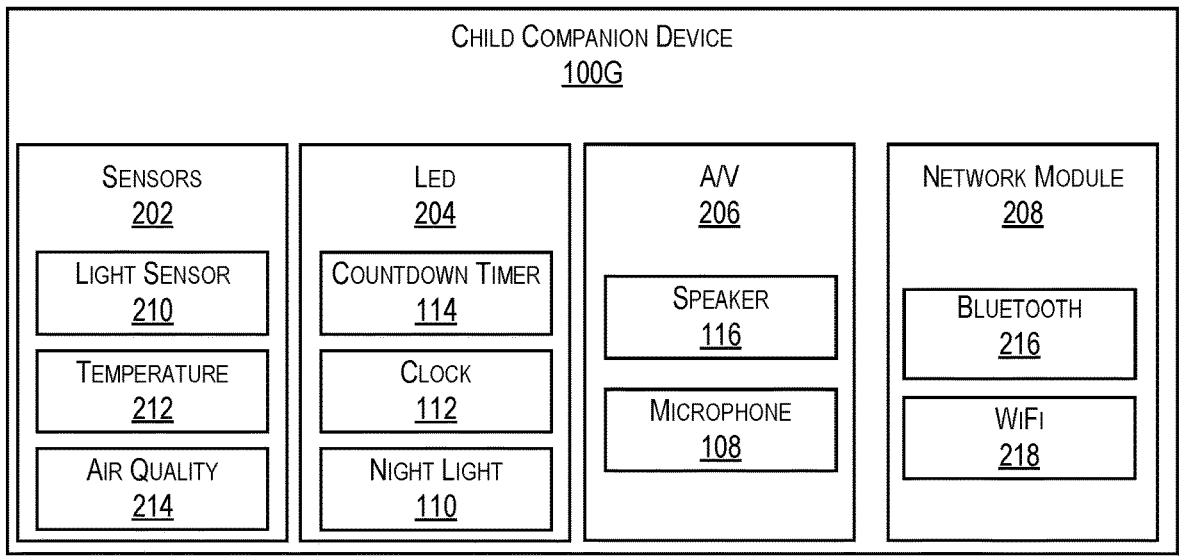

In an embodiment, as shown in FIG. 2G, a seventh configuration of the child companion device 100G may include the one or more sensors 202 having the light sensor 210, the temperature sensor 212, and an air quality sensor 214. Further, the one or more LEDs 204 may include the countdown timer 114, the clock 112, and the night light 110. The one or more audio-video devices 206 may include the speaker 116 and the microphone 108. Further, the one or more network modules 208 may include the Bluetooth 216 and the Wi-Fi 218.

Figure 2H:
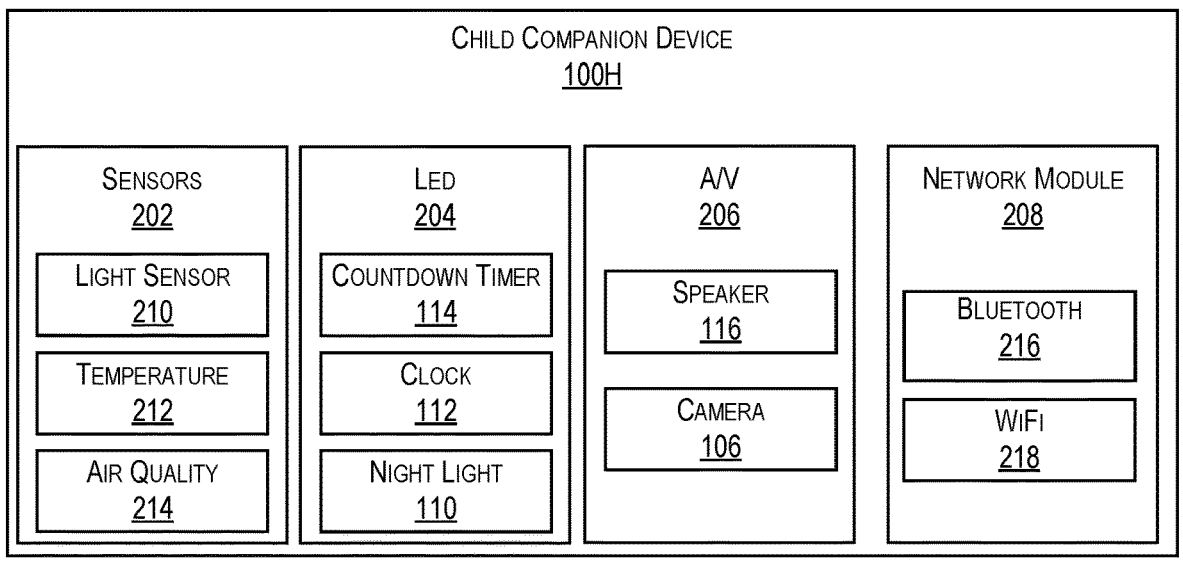

In an embodiment, as shown in FIG. 2H, an eighth configuration of the child companion device 100H may include the one or more sensors 202 having the light sensor 210, the temperature sensor 212, and an air quality sensor 214. Further, the one or more LEDs 204 may include the countdown timer 114, the clock 112, and the night light 110. The one or more audio-video devices 206 may include the speaker 116 and the camera 106. Further, the one or more network modules 208 may include the Bluetooth 216 and the Wi-Fi 218.

Figure 2I:
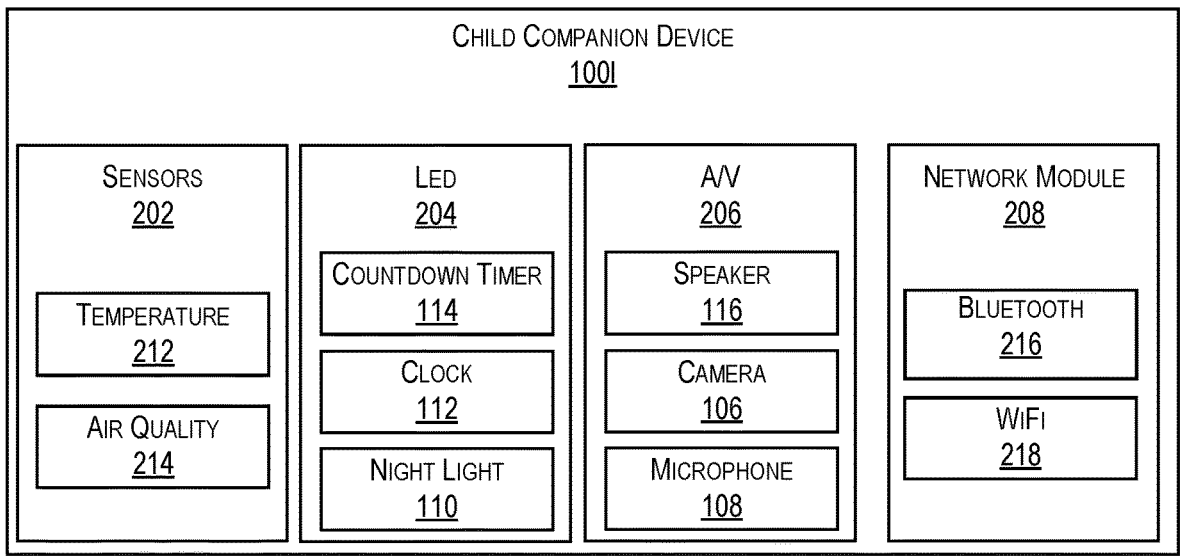

In an embodiment, as shown in FIG. 2I, a ninth configuration of the child companion device 100I may include the one or more sensors 202 having the temperature sensor 212 and an air quality sensor 214. Further, the one or more LEDs 204 may include the countdown timer 114, the clock 112, and the night light 110. The one or more audio-video devices 206 may include the speaker 116, the camera 106, and the microphone 108. Further, the one or more network modules 208 may include the Bluetooth 216 and the Wi-Fi 218.

Figure 2J:
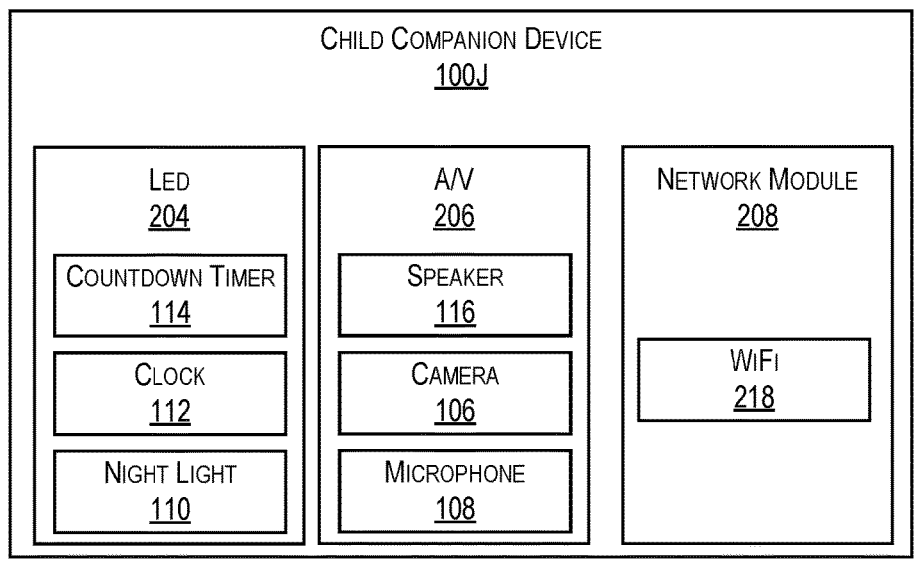

In an embodiment, as shown in FIG. 2J, a tenth configuration of the child companion device 100J may include the one or more LEDs 204 having the countdown timer 114, the clock 112, and the night light 110. The one or more audio-video devices 206 may include the speaker 116, the camera 106, and the microphone 108. Further, the one or more network modules 208 may include the Wi-Fi 218. Hereinafter, the child companion device 100 may correspond to any of the configurations of the child companion device 100A-100J as described in FIGS. 2A-2J without departing from the scope of the disclosure.

Figure 3:
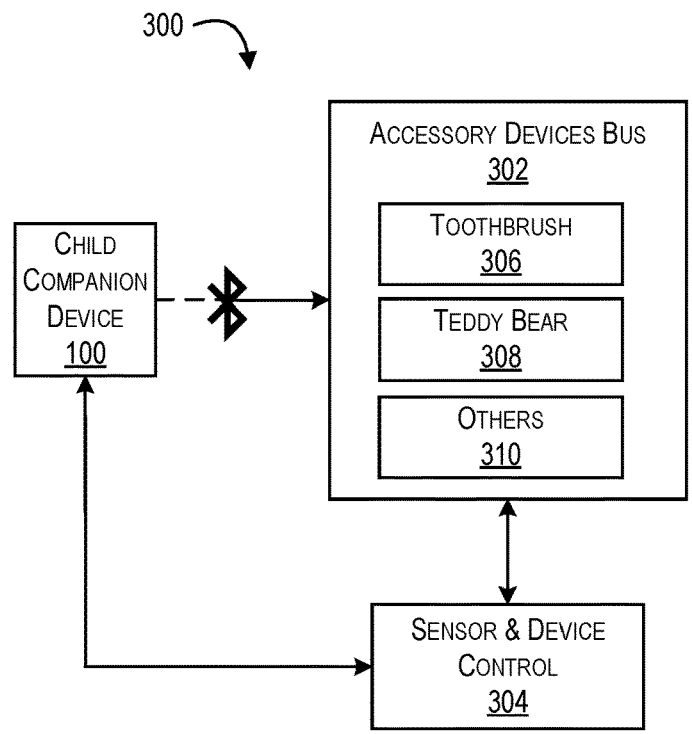
FIG. 3 illustrates a block diagram of the child companion device coupled to an accessory, in accordance with an embodiment of the present disclosure.

FIG. 3 illustrates a block diagram 300 of the child companion device 100 coupled to an accessory, in accordance with an embodiment of the present disclosure. In some embodiment, the child companion device 100 may be coupled to an accessory device bus 302, via a wireless technology (such as Bluetooth), for communicatively coupling the child companion device 100 with an accessory, such as a toothbrush 306, a teddy bear 308, and any other accessory 310. The child companion device 100 may also be coupled to a sensor and device control 304 for controlling the operation of the attached accessory. The control of the attached accessory may, without any limitation, be based on the pre-recorded routine, the determined routines, the pre-recorded user instructions, the real-time instructions by the user, inputs by the child, or the like. It may be understood that the controlling may, without any limitation, include setting a timer of the toothbrush 306, triggering a noise machine of the teddy bear 308, instructing the teddy bear 308 to recite a story, providing instructions on proper brushing techniques, or the like.

Figure 4:
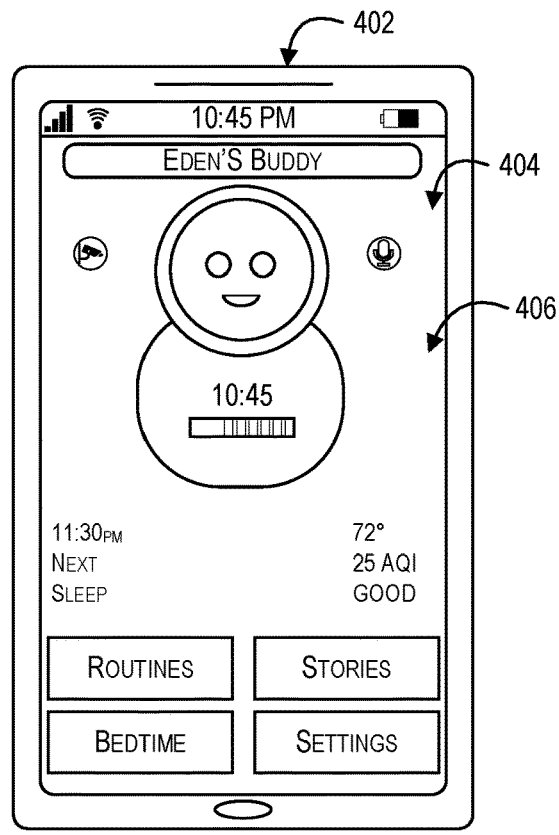
FIG. 4 illustrates a user device showing an application coupled to the child companion device, in accordance with an embodiment of the present disclosure.

FIG. 4 illustrates the user device 402 showing an application 406 coupled to the child companion device 100, in accordance with an embodiment of the present disclosure. In an embodiment, the user device 402 may correspond to an electronic device having a user interface 404 and a network connectivity to connect to a network for interacting with the child companion device 100. Thus, for example, the user device 402 may, without any limitation, include a mobile phone, a laptop, a tablet, and a Personal Digital Assistant (PDA) device. The network may, without any limitation, include Bluetooth, Wi-Fi, a Local Area Network (LAN), a Wide Area Network (WAN), a wireless network, the Internet, and the like. In an embodiment, the application 406 may be a computer program product installed on the user device 402. As illustrated, the application 406 may provide one or more features associated with the child companion device 100 for monitoring and controlling. In an embodiment, the application 406 may provide current-status of the child companion device 100. In another embodiment, the application 406 may provide an option to view video associated with the place of installation and/or an option to listen to audio associated with the place of installation. In yet another embodiment, the application 406 may provide, to the user, ambient parameters of the place of installation, time of next sleep, an option to select routine, an option to select stories, an option to modify bedtime, and/or an option to modify settings.

In operation, the application 406 may perform the steps of receiving data from the child companion device 100. The data may be associated with the place of installation and corresponding to the one or more ambient parameters, captured images, captured videos, and captured audio. In an embodiment, the application 406 may perform the steps of analyzing the received data to determine an ideal sleep routine by employing one or more Artificial Intelligence (AI) models. In an embodiment, the application 406 may perform the steps of rendering the received data from the child companion device 100 and the determined ideal sleep routine to the user. In an embodiment, the application 406 may perform the steps of receiving one or more inputs from the user associated with one or more instructions, a custom sleep routine, an approval for the determined ideal sleep routine, and/or a selection of a sleep routine from one or more sleep routines in a marketplace. It may be understood that the marketplace may be a digital platform where a third party (a user or a company) may store one or more routines, one or more audio, or necessary data for monitoring/observing/training the child. Such data may be available to all the users across the marketplace for downloading or implementing on the corresponding child companion device 100. In some embodiment, the downloading of such data may require a monetary transaction without departing from the scope of the disclosure.

In an embodiment, the application 406 may perform the steps of sending the received one or more inputs to the child companion device 100 for rendering the one or more inputs, and/or controlling one or more components of the child companion device 100 to implement the one or more inputs. It may be understood that implementing the one or more inputs on the child companion device 100 may correspond to either of providing one or more lighting based outputs, providing sound-based outputs, and/or controlling the intensity of one or more light sources. For example, the application 406 may facilitate the user to customize and monitor various features of the child companion device 100, set the bedtime, set the wake-up time, customize the bedtime or wake-up time routines, track the child's progress, adjust settings of the night light 110, white noise generator, and/or wake-up light. Accordingly, the application 406 may facilitate the user to manage the child's sleep habits and routines to ensure the child gets the rest that would be essential for growth and development.

In some embodiments, the application 406 may perform the steps of assigning and tracking a child's responsibilities (not shown). The user interface 404 can display a list of pre-set tasks, or the child can create custom ones. The child can set a due date, mark tasks as completed, and earn virtual rewards for their efforts. The application 406 may also have a parent-child synchronization feature, allowing the parent to monitor progress and provide positive reinforcement. This feature fosters a sense of accountability and accomplishment.

In another embodiment, the application 406 may include a digital wallet (not shown), where the child can interact with the user interface 404 to allocate virtual money for spending, saving, and setting financial goals. They can practice making purchases in a virtual store, learning about budgeting and making informed decisions. The toy could also incorporate interactive scenarios that teach concepts like earning, saving, and managing money, reinforcing essential financial skills.

In another embodiment, the application 406 may include a messaging system (not shown) with the user interface 404. The child can use it to role-play conversations with virtual characters (not shown) or even with the child companion device 100 itself, which could use pre-recorded responses or speech synthesis technology. The child companion device 100 may provide prompts and feedback to help the child practice effective communication, such as active questions, active listening, and expressing themselves clearly. This would further improve the child's communication skills.

In another embodiment, the application 406 may include interactive scenarios and activities that teach the child about recycling, conserving resources, and taking care of the environment (not shown). For example, the child can sort virtual recyclables into different bins on the user interface 404. The child companion device 100 may provide feedback on their choices, through noises or alarms and the like, and explains the importance of eco-friendly practices. Other interactive scenarios and activities, such as activities that promote mindfulness and relaxation techniques (not shown) may also be included. For example, guided breathing exercises, soothing sounds, and visualizations. The child may interact with the user interface 404 to select and engage in different relaxation activities. The child companion device may then provide gentle prompts and calming feedback, helping the child develop self-awareness and stress-relief skills.

In another embodiment, the application 406 may include a visual goal board or journal on the user interface 404 where the child can set and track personal goals. Using the touchscreen, the child can input their goals, set deadlines, and monitor their progress. The child companion device 100 may also include motivational messages and virtual rewards for reaching milestones. This feature encourages the child to take initiative, build self-discipline, and experience the satisfaction of achieving their objectives.

Figure 5:
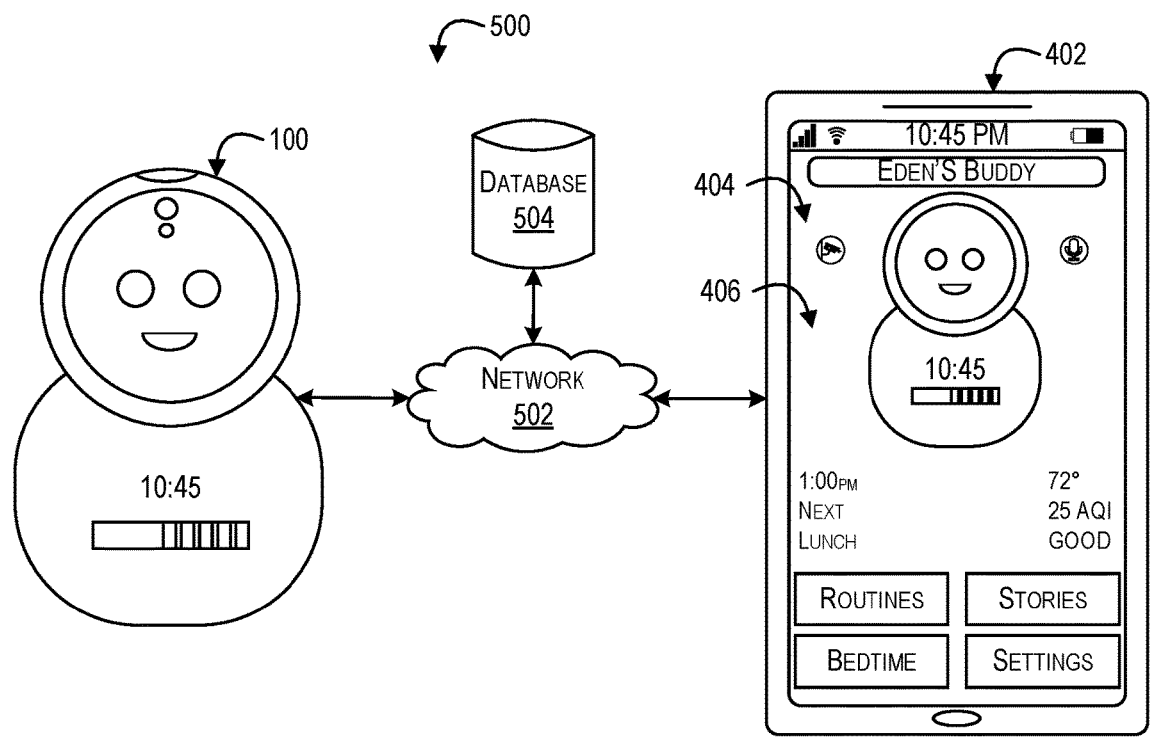
FIG. 5 illustrates a system having a child companion device coupled to the user device, in accordance with an embodiment of the present disclosure.

FIG. 5 illustrates a system 500 having the child companion device 100 coupled to the user device 402, in accordance with an embodiment of the present disclosure. In some embodiments, the system 500 may include the child companion device 100 communicatively coupled to the user device 402 through a network 502. The network 502 may, without any limitation, include Bluetooth, Wi-Fi, a Local Area Network (LAN), a Wide Area Network (WAN), a wireless network, the Internet, and the like. In an embodiment, the network 502 may be communicatively coupled to a database 504 to store data associated with the system 500, for example images, videos, and audio capture by the child companion device 100. The database 504 may, without any limitation, be a cloud-based storage. The child companion device 100 may send and/or receive data from the user device 402 via the network 502, as discussed in the previous paragraphs. Further, the user device 402 may have the application 406 installed to perform various steps for monitoring and controlling the child companion device 100, as discussed in the previous paragraphs.

In some embodiments, the child companion device 100 may, through bluetooth, connect to the child's cellular device (not shown) or user device 402 and play music stored from either from the user device 402 or the child's cellular device (not shown). For example, the music can be country music, rap, pop, 80's music, or any other music the child may like. The music may also be streamed from the internet in some embodiments. The user interface 406 may provide on-screen options that allow the user to tune to AM, FM, or internet radio stations. The user interface 406 may also include news channels, such as Fox, CNN, or MSNBC among the like for the child to choose from and tune into.

Figure 6A:
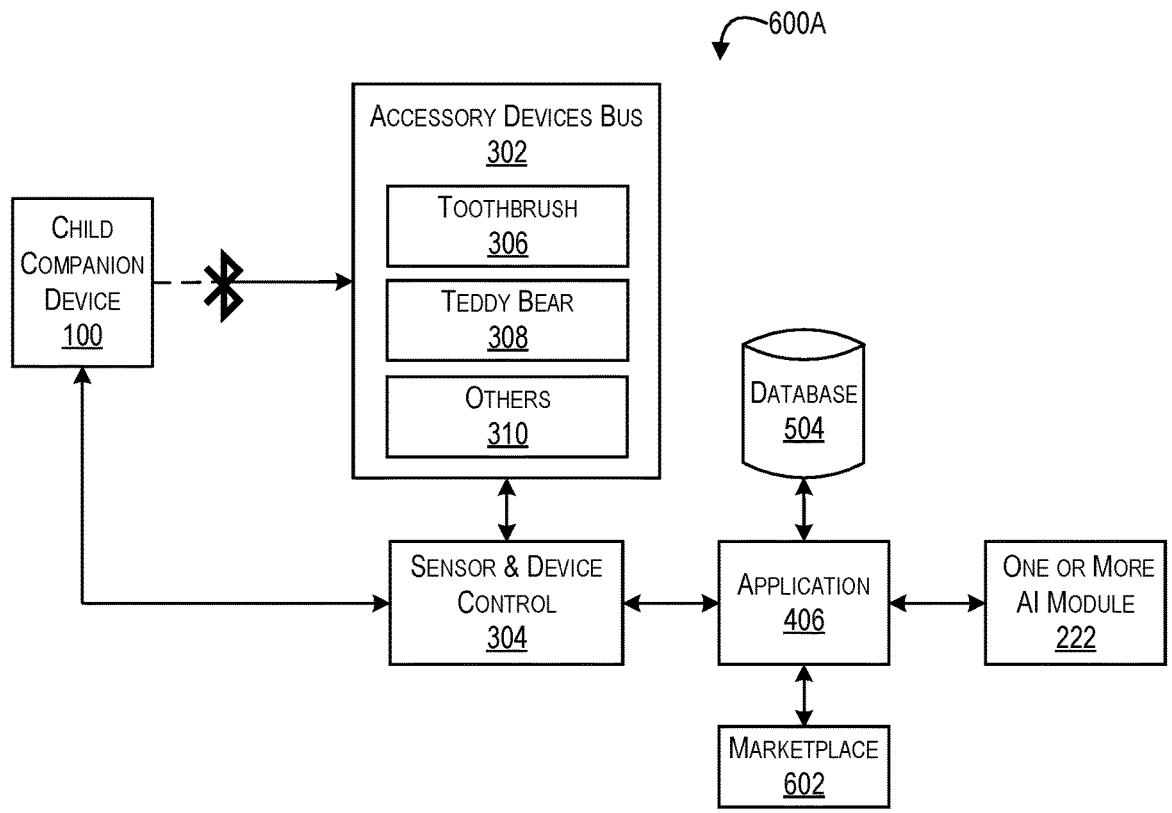
FIGS. 6A-6B illustrate block diagrams of various configurations of the system, in accordance with an embodiment of the present disclosure.
Figure 6B:
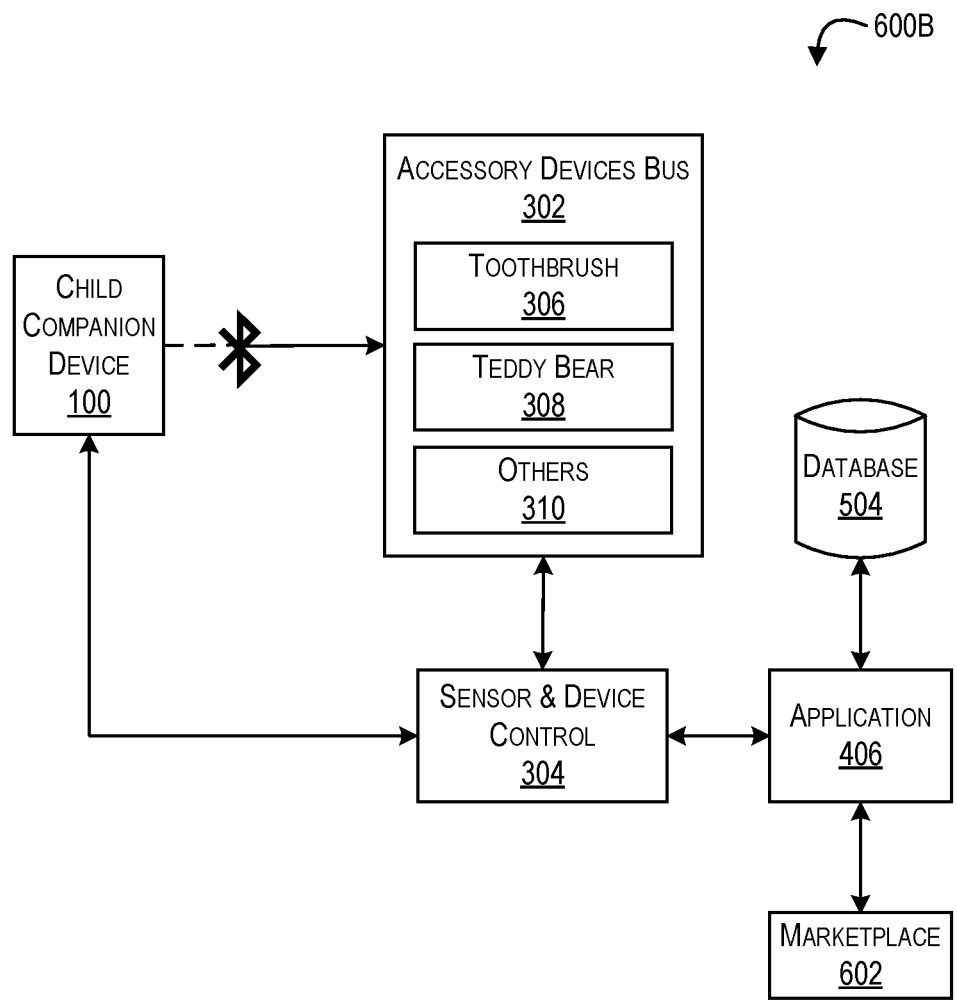

FIGS. 6A-6B illustrate block diagrams of various configurations 600A-600B of the system 500, in accordance with an embodiment of the present disclosure. It may be understood that the configurations 600A and 600B may include any of the configurations of the child companion device 100A-100J as described in FIGS. 2A-2J without departing from the scope of the disclosure.

In an embodiment, as shown in FIG. 6A, a first configuration 600A of the system 500 may include the child companion device 100 coupled to one or more accessories, the sensor and device control 304, and the application 406 installed on the user device 402. The application 406 may facilitate the user to access the database 504 and the marketplace 602. As discussed in previous paragraphs, the marketplace 602 may be a digital platform where a third party (a user or a company) may store one or more routines, one or more audio, or necessary data for monitoring/observing/training the child. Such data may be available to all the users across the marketplace 602 for downloading or implementing on the corresponding child companion device. In some embodiment, the downloading of such data may require a monetary transaction without departing from the scope of the disclosure. Additionally, the application 406 may also be coupled to the AI module 222 to access and analyze the data stored in the database 504 to determine one or more routines for the child.

In an embodiment, as shown in FIG. 6B, a second configuration 600B of the system 500 may include the child companion device 100 coupled to one or more accessories, the sensor and device control 304, and the application 406 installed on the user device 402. The application 406 may facilitate the user to access the database 504 and the marketplace 602. However, the application 406 may not be coupled to the AI module 222 for analyzing the data stored in the database 504 to determine one or more routines for the child. On the other hand, the application 406 may be completely user dependent and may require inputs from the user for controlling various operations of the child companion device 100, such the setting one or more routines, monitoring data, setting light intensity, setting sleep time, setting wake-up time, or the like.

Figure 7:
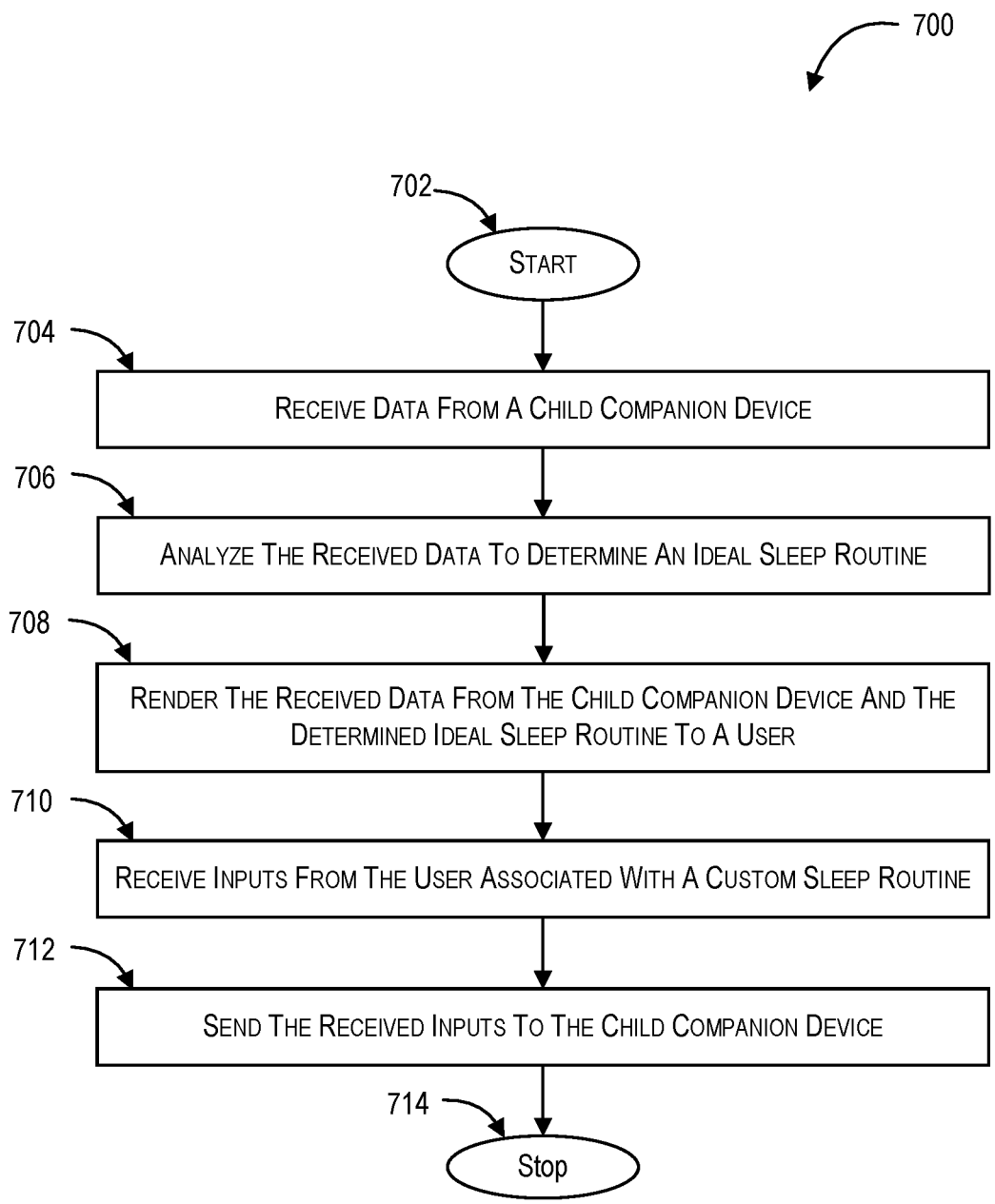
FIG. 7 illustrates a flowchart illustrating an operation of the system, in accordance with an embodiment of the present disclosure.

FIG. 7 illustrates a flowchart 700 illustrating an operation of the system, in accordance with an embodiment of the present disclosure. The method starts at step 702.

At first, data associated with a place of installation may be received, at step 704, from a child companion device. The data may correspond to one or more ambient parameters, captured images, captured videos, and/or captured audio. The one or more ambient parameters may, without any limitation, include temperature, air quality, and luminance in the place of installation.

At step 706, the received data may be analyzed to determine an ideal sleep routine by employing one or more Artificial Intelligence (AI) models. Then, the received data from the child companion device and/or the determined ideal sleep routine may be rendered to a user, at step 708. Next, one or more inputs associated with one or more instructions, a custom sleep routine, an approval for the determined ideal sleep routine, and/or a selection of a sleep routine from one or more sleep routines in a marketplace may be received from the user, at step 710.

Thereafter, the received one or more inputs may be sent, at step 712, to the child companion device for rendering the one or more inputs, and/or controlling one or more components of the child companion device to implement the one or more inputs. It may be understood that implementing the one or more inputs on the child companion device may correspond to providing one or more lighting based outputs, providing sound-based outputs, and/or controlling the intensity of one or more light sources. Further, the method may include the steps of controlling the intensity of the one or more light sources to gradually decrease the intensity with the time left to sleep and gradually increasing the intensity with the time left to wake-up. The method ends at step 714.

The disclosed child companion device is a fully integrated all-in-one device that allows the features to work together and allows users to create routines that interact with all the features. For example, the child companion device may listen and watch for when a child wakes up in the middle of the night and automatically start playing soothing sounds or a story. Or if the light sensor detects light in the middle of the night, it may notify the parents that the child has turned on the lights in the room. Further, the child companion device facilitates the user to interact with all the sensors and features to make a truly customizable routines, such that the routines are both event-driven and time-driven and may be triggered by a set time or by something happening like the child starting to cry in the middle of the night or the child is making a lot of movements in the middle of the night. The disclosed child companion device further can use AI or another mechanism to monitor the child's sleep and automatically trigger the routine that will give the child the best night's sleep. Accordingly, the disclosed child companion device integrates multiple features in a smart way that allows them to be monitored and controlled remotely by the user. Additionally, the disclosed child companion device has a self-learning child development feature to learn how to give a child the best night's sleep, learn what sounds help the child sleep better by watching and listening to the child and automatically adjusting the white noise to improve the child's sleep. Accordingly, the disclosed child companion device builds a whole ecosystem of smart kid's devices that all talk to each other and aid in the child's development.

Accordingly, the disclosed child companion device eliminates the need for multiple devices and allows parents to easily select and customize routines for bedtime, wake-up time, and many other activities to promote a healthy and fun structure for children. Further, the disclosed child companion device provides the caregiver with multiple out-of-the-box routines, and can easily be customized for any situation. Furthermore, a marketplace allows third parties to create unique content, stories and routines that support various activities required for religious, cultural, or special need development and education. Additionally, the disclosed child companion device is easy to set up, monitor and control via the application that supports multiple child companion devices to take care of multiple children while providing a secure controlled access for various caretakers.

Figure 8:
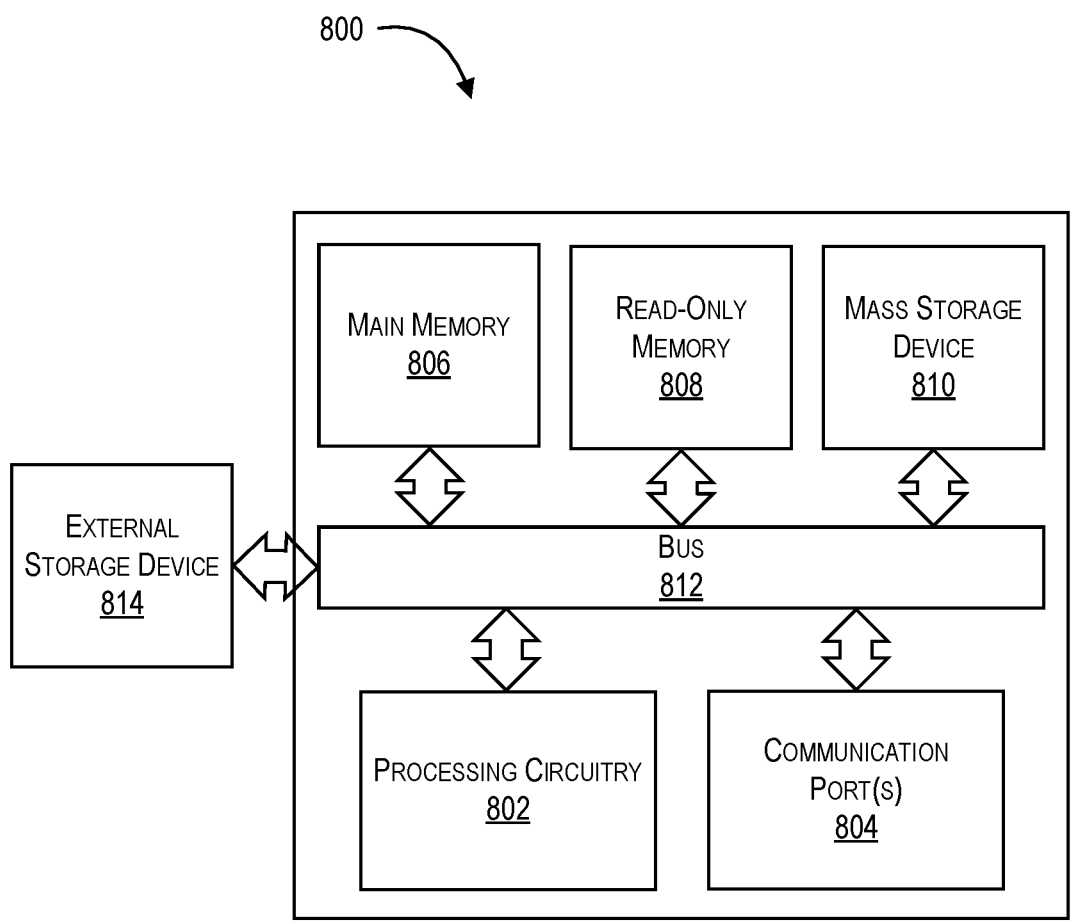
FIG. 8 illustrates an exemplary computer unit in which or with which embodiments of the present disclosure may be utilized.

FIG. 8 illustrates an exemplary computer system in which or with which embodiments of the present disclosure may be utilized. Depending upon the implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware. As shown in FIG. 8, the computer system 800 includes an external storage device 814, a bus 812, a main memory 806, a read-only memory 808, a mass storage device 810, a communication port(s) 804, and a processing circuitry 802.

Those skilled in the art will appreciate that the computer system 800 may include more than one processing circuitry 802 and one or more communication ports 804. The processing circuitry 802 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quad-core, Hexa-core, or any suitable number of cores) or supercomputer. In some embodiments, the processing circuitry 802 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 802 include, but are not limited to, an Intel® Itanium® or Itanium 2 processor(s), AMD® Opteron® or Athlon MP® processor(s), Motorola® lines of processors, System on Chip (SoC) processors, or other future processors. The processing circuitry 802 may include various modules associated with embodiments of the present disclosure.

The communication port 804 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 804 may be any RS-232 port for use with a modem-based dialup connection, a 10/100 Ethernet port, a Gigabit, or a 10 Gigabit port using copper or fiber, a serial port, a parallel port, or other existing or future ports. The communication port 804 may be chosen depending on a network, such as a Local Area Network (LAN), Wide Area Network (WAN), or any network to which the computer system 800 may be connected.

The main memory 806 may include Random Access Memory (RAM) or any other dynamic storage device commonly known in the art. Read-only memory (ROM) 808 may be any static storage device(s), e.g., but not limited to, a Programmable Read-Only Memory (PROM) chips for storing static information, e.g., start-up or BIOS instructions for the processing circuitry 802.

The mass storage device 810 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 806. The mass storage device 810 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 812 communicatively couples the processing circuitry 802 with the other memory, storage, and communication blocks. The bus 812 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 802 to the software system.

Optionally, operator and administrative interfaces, e.g., a display, keyboard, and a cursor control device, may also be coupled to the bus 812 to support direct operator interaction with the computer system 800. Other operator and administrative interfaces may be provided through network connections connected through the communication port(s) 804. The external storage device 814 may be any kind of external hard drives, floppy drives, IOMEGA® Zip Drive, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the exemplary computer system limit the scope of the present disclosure.

The computer system 800 may be accessed through a user interface. The user interface application may be implemented using any suitable architecture. For example, it may be a stand-alone application wholly implemented on the computer system 800. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on an electronic device computer system 800 is retrieved on-demand by issuing requests to a server remote to the computer system 800. For example, computer system 800 may receive inputs from the user via an input interface and transmit those inputs to the remote server for processing and generating the corresponding outputs. The generated output is then transmitted to the computer system 700 for presentation to the user.

While embodiments of the present disclosure have been illustrated and described, it will be clear that the disclosure is not limited to these embodiments only. Numerous modifications, changes, variations, substitutions, and equivalents will be apparent to those skilled in the art without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the concepts herein. The subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification claims refer to at least one of something selected from the group consisting of A, B, C . . . . And N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed is:

1. A child companion device comprising:
    a housing having a child friendly structure to house:
        one or more sensors to sense one or more ambient parameters associated with a place of installation;
        one or more light sources to provide one or more lighting based outputs;
        one or more audio-video devices for providing sound-based outputs and at least one of: capturing images and videos associated with the place of installation, and capturing audio associated with the place of installation; and
        one or more network connection modules to communicatively couple the child companion device with a user device for data exchange pertaining to at least one of: the one or more sensors, the one or more light sources, and the one or more audio-video devices, wherein an application installed on the user device facilitates a user with at least one of: receiving data from the child companion device, analysing the received data, sending data to the child companion device, and controlling the child companion device.

2. The child companion device of claim 1, wherein the one or more sensors include at least one of: a temperature sensor, an air quality sensor, and a light sensor to sense data associated with temperature, air quality, and luminance in the place of installation, respectively.

3. The child companion device of claim 1, wherein the one or more light sources associated with at least one of: a countdown timer, a clock, and a night light to provide outputs pertaining to at least one of: lighting requirements, countdown, time, alarm, time left to sleep, and time left to wake up.

4. The child companion device of claim 3, wherein intensity of the one or more light sources gradually decreases with the time left to sleep and gradually increases with the time left to wake up.

5. The child companion device of claim 3, wherein further comprises a customizable snooze button associated with operation of the alarm.

6. The child companion device of claim 1, wherein the one or more audio-video devices include at least one of: a speaker, a camera, and a microphone to provide audio instruction to a child, generate white noise, to capture images and videos of the child and the place of installation, and to capture audio of the child and the place of installation, respectively.

7. The child companion device of claim 1, wherein the camera is a night vision camera with a wide-angle lens to clearly capture wide area images and videos even in darkness.

8. The child companion device of claim 1, wherein the one or more network connection modules includes at least one of: a Bluetooth module and a Wireless Fidelity (Wi-Fi) module.

9. The child companion device of claim 1, further comprises an analyser module to analyze at least one of: the one or more ambient parameters, the captured images, the captured videos, and the captured audio to determine an ideal sleep routine of the child by employing one or more Artificial Intelligence (AI) models to control the child companion device.

10. A non-transitory computer readable medium comprising: computer readable program instructions that, when executed by one or more processors, cause the one or more processors to perform:
    receiving data from a child companion device associated with a place of installation and corresponding to at least one of: one or more ambient parameters, captured images, captured videos, and captured audio;
    analyzing the received data to determine an ideal sleep routine by employing one or more Artificial Intelligence (AI) models;
    rendering at least one of: the received data from the child companion device and the determined ideal sleep routine to a user;
    receiving one or more inputs from the user associated with at least one of: one or more instructions, a custom sleep routine, an approval for the determined ideal sleep routine, and a selection of a sleep routine from one or more sleep routine in a marketplace; and
    sending the received one or more inputs to the child companion device for at least one of: rendering the one or more inputs, and controlling one or more components of the child companion device to implement the one or more inputs.

11. The computer program product of claim 10, wherein the one or more ambient parameters include at least one of: temperature, air quality, and luminance in the place of installation.

12. The computer program product of claim 10, wherein implementing the one or more inputs on the child companion device corresponds to at least one of: providing one or more lighting based outputs, providing sound-based outputs, and controlling the intensity of one or more light sources.

13. The computer program product of claim 10, wherein controlling the intensity of the one or more light sources corresponds to gradually decreasing the intensity with the time left to sleep and gradually increasing the intensity with the time left to wake up.

14. A system comprising:
    a child companion device having:
        one or more sensors to sense one or more ambient parameters associated with a place of installation;
        one or more light sources to provide one or more lighting based outputs;
        one or more audio-video devices for at least one of: providing sound-based outputs, capturing images and videos associated with the place of installation, and capturing audio associated with the place of installation; and
        one or more network connection modules to communicatively couple the child companion device with a user device for data exchange pertaining to at least one of:
    the one or more sensors, the one or more light sources, and the one or more audio-video devices; and
    the user device having an application for:
        receiving data from a child companion device associated with a place of installation and corresponding to at least one of: one or more ambient parameters, captured images, captured videos, and captured audio;
        analyzing the received data to determine an ideal sleep routine by employing one or more Artificial Intelligence (AI) models;
        rendering at least one of: the received data from the child companion device and the determined ideal sleep routine to a user;
        receiving one or more inputs from the user associated with at least one of: one or more instructions, a custom sleep routine, an approval for the determined ideal sleep routine, and a selection of a sleep routine from one or more sleep routine in a marketplace; and
        sending the received one or more inputs to the child companion device for at least one of: rendering the one or more inputs, and controlling one or more components of the child companion device to implement the one or more inputs.

15. The system of claim 14, wherein the one or more sensors include at least one of: a temperature sensor, an air quality sensor, and a light sensor to sense data associated with temperature, air quality, and luminance in the place of installation, respectively.

16. The system of claim 14, wherein the one or more light sources associated with at least one of: a countdown timer, a clock, and a night light to provide outputs pertaining to at least one of: lighting requirements, countdown, time, alarm, time left to sleep, and time left to wake up.

17. The system of claim 16, wherein intensity of the one or more light sources gradually decreases with the time left to sleep and gradually increases with the time left to wake up.

18. The system of claim 14, wherein the one or more audio-video devices include at least one of: a speaker, a camera, and a microphone to provide audio instruction to a child, generate white noise, to capture images and videos of the child and the place of installation, and to capture audio of the child and the place of installation, respectively.

19. The system of claim 14, wherein the camera is a night vision camera with a wide-angle lens to clearly capture wide area images and videos even in darkness.

20. The system of claim 14, wherein the one or more network connection modules includes at least one of: a Bluetooth module and a Wireless Fidelity (Wi-Fi) module.

\* \* \* \* \*